Oct. 10, 1967  S. KITROSSER  3,345,924
IDENTIFICATION CARD CAMERA
Filed Sept. 17, 1965  4 Sheets-Sheet 1

INVENTOR
SAMUEL KITROSSER
BY *Stanley Belsky*
ATTORNEY

Oct. 10, 1967 S. KITROSSER 3,345,924
IDENTIFICATION CARD CAMERA
Filed Sept. 17, 1965 4 Sheets-Sheet 2

INVENTOR
SAMUEL KITROSSER
BY Stanley Belsky
ATTORNEY

Oct. 10, 1967    S. KITROSSER    3,345,924
IDENTIFICATION CARD CAMERA

Filed Sept. 17, 1965    4 Sheets-Sheet 3

INVENTOR
SAMUEL KITROSSER

BY *Stanley Belsky*
ATTORNEY

Oct. 10, 1967 S. KITROSSER 3,345,924
IDENTIFICATION CARD CAMERA
Filed Sept. 17, 1965 4 Sheets-Sheet 4

SAMUEL KITROSSER
INVENTOR.

BY Stanley Belsky
Attorney

United States Patent Office 3,345,924
Patented Oct. 10, 1967

3,345,924
IDENTIFICATION CARD CAMERA
Samuel Kitrosser, Lexington, Mass., assignor to Avant Incorporated, Lincoln, Mass., a corporation of Massachusetts
Filed Sept. 17, 1965, Ser. No. 490,775
3 Claims. (Cl. 95—1.1)

This application is a continuation-in-part of my co-pending application Ser. No. 395,827, filed Sept. 11, 1964, now abandoned.

The present invention is directed to cameras for making identification cards. In particular, the invention is directed to a camera adapted to produce from a single exposure of a subject a plurality of identical identification cards containing a photograph of the subject and data related thereto. More particularly, the camera is useful for making cards of the type used for drivers' licenses wherein a photograph of the operator appears in one portion of the license while pertinent data relative to the driver appears on the remainder of the format of the license. More particularly, the invention is directed to a diffusion transfer camera for rapidly providing duplicate identification cards.

Diffusion transfer process cameras are characterized by their ability to provide a positive photograph shortly after exposure. At present, diffusion transfer process film will yield, after exposure, a positive print within several seconds, and a color print within a minute. An example of this diffusion transfer process are the types 42, 47 and 107 black and white films and the types 48 and 108 colored films manufactured by the Polaroid Corporation, Cambridge, Mass. In my patent, No. 3,128,685, issued Apr. 14, 1964, and assigned to the common assignee of this application, there is described a diffusion transfer process camera for making a plurality of identical photographs of a subject for identification purposes. This invention is directed to an improvement over the aforementioned camera wherein a plurality of identification cards containing both textural information and a photograph of the subject may be made instantaneously while the subject is still available. In contrast to prior art cameras, the camera of the instant invention solves several needs in the identification camera field. The identification cards are prepared with a minimum of delay, and a duplicate of the card for file use may be prepared at the same time that the original card is prepared.

One disadvantage of some prior art cameras used for making identification cards is that they require separate focusing of the data and the subject, whereby change in the camera relative to the subject requires refocusing of the data lens systems. Prior art cameras of this type require a relatively high degree of skill on the part of the operator for consistent results. Still further disadvantages of prior art cameras are that they are so constructed that a complete set of data must be placed in position for each subject. These cameras are not adapted to allow for insertion of only the variable portion of the data that changes with each person for whom an identification card is to be prepared. Still another disadvantage of prior art cameras is that they do not provide means for balancing light between the data media and the subject. Other prior art cameras are complex in construction requiring complex optical arrangements.

It is, therefore, an object of this invention to provide an improved identification card camera that simultaneously produces a plurality of similar identification cards containing photographic images and data relating thereto.

A further object of this invention is to provide an improved identification card camera that is simple to operate, has high reliability, and provides identification cards without delay.

A still further object of this invention is to provide an improved identification card camera that is compact, simple to manufacture and low in cost.

An object of this invention is to provide an improved identification card camera in which only variable portions of the data need be changed for each subject for whom an identification card is prepared.

A further object of this invention is to provide an improved identification card camera that is capable of selectively producing a single identification card or a plurality of identification cards.

In accordance with the invention there is provided a camera for producing, with a single exposure, a plurality of identical identification cards containing a photograph of a subject and data relating thereto on a unitary sheet of photographic material disposed in the camera focal plane. The camera includes a housing having a light-tight compartment therein. There are provided within the light-tight compartment baffle means having edges disposed substantially in the focal plane for dividing the unitary sheet of photographic material into at least four discrete areas. Data support means coupled to the housing are provided for supporting the data to be recorded in spaced parallel relationship to the focal plane. Provided within the housing are a plurality of optical means, each of which substantially focuses the data through one of the baffle means onto the image receiving material for providing a plurality of images of the data. Second optical means coupled to the housing are provided for focusing a subject disposed remotely from the housing through second ones of the baffle means, onto the image receiving material to provide a plurality of images of the subject. There are further provided shutter means coupling the optical means and the photographic material. Means for transporting and storing an image receiving material are disposed within the light-tight compartment and in the camera focal plane. The aforementioned means include means for processing the photographic material, whereby a single exposure through the shutter means provides a plurality of identification cards in the form of a plurality of photographs of the data and subject on the unitary sheet of photographic material.

For a better understanding of the present invention, reference is made to the following description taken in connection with accompanying drawings and the scope will be pointed out in the appended claims.

Figures 1, 1A:
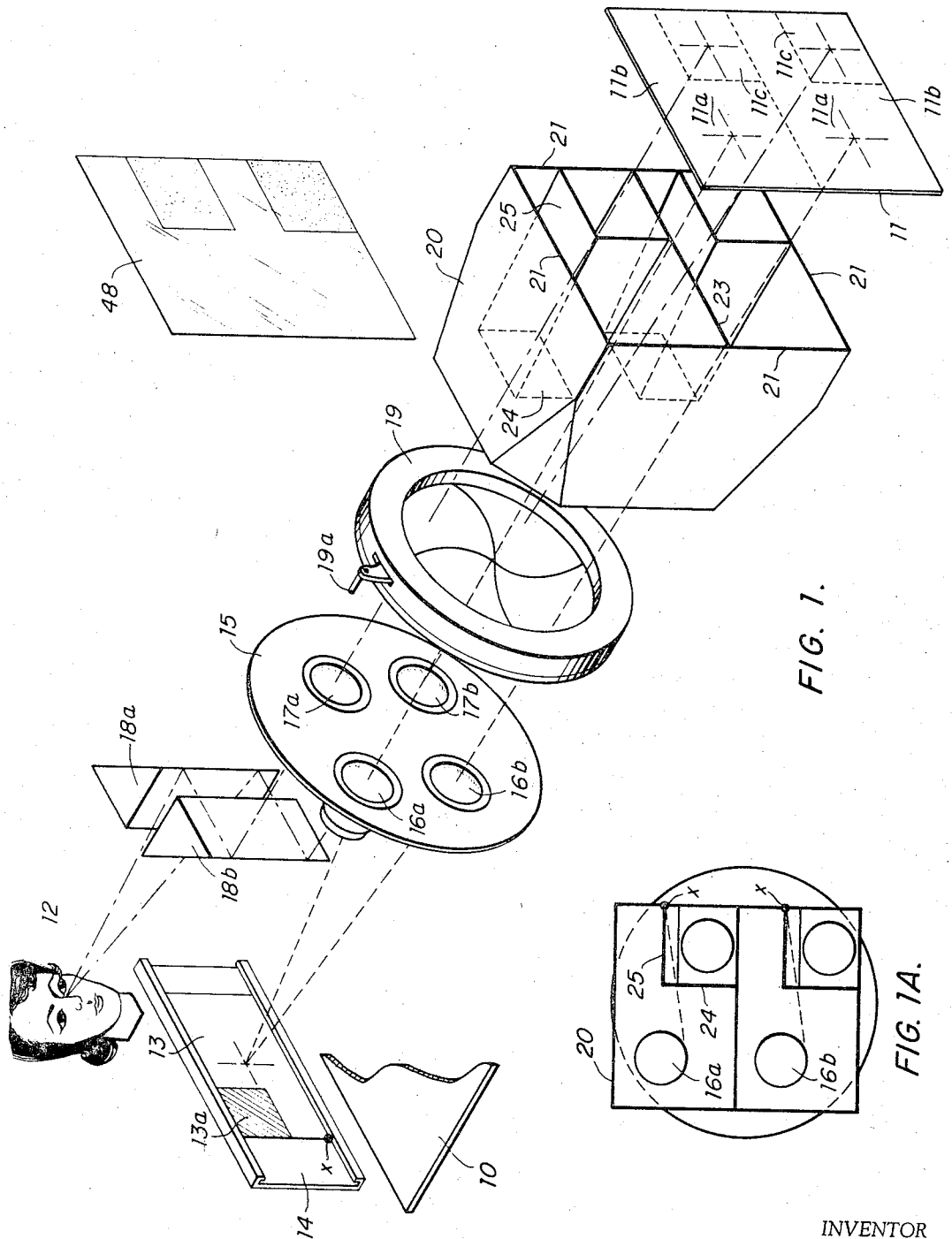
FIGURE 1 is a partially schematic exploded view of a camera, with its housing removed, embodying the present invention.
FIGURE 1A is an end view of the camera baffle shown in FIG. 1 as viewed from the camera focal plane with the shutter open.

FIGURE 1 is a partially schematic exploded view of the camera shown with its housing 10 broken away. Coupled to the housing 10 is an image receiving material 11 disposed in the focal plane of the camera. Shown as dotted lines on the image receiving material are two identical identification cards 11a produced by the camera. Each identification card 11a contains a data area 11b and a subject area 11c. The subject being photographed is shown at 12 while a data card being photographed is shown at numeral 13. The data card 13 is supported in spaced parallel relationship to the image receiving material by a data support means in the form of easel 14 coupled to the housing 10. The data card 13 is removably coupled to the easel 14 so that it may be replaced by a different card for each subject being photographed. Formed within the housing 10 is a light-tight compartment having at its rear most extreme the image receiving material 11 and its associated support means, and on its forward extreme a lens plate 15. Coupled to the lens plate are first optical means in the form of data lenses 16a and 16b for focusing the data bearing card 13 onto the image receiving material 11, and second optical means in the form of subject lenses 17a and 17b for imaging the subject 12 onto the image receiving material 11. Each of the first and second optical means are preferably optically configured similar to the lens system described in my aforementioned patent which is hereby incorporated by reference, and thus will not be described herein. That is, correction of the lens pairs is in the direction to cause divergence of the uncorrected image rays so that they converge at the subject. However, it should be understood that the lens pairs may be uncovered where geometrical identity is not critical.

Figure 2:
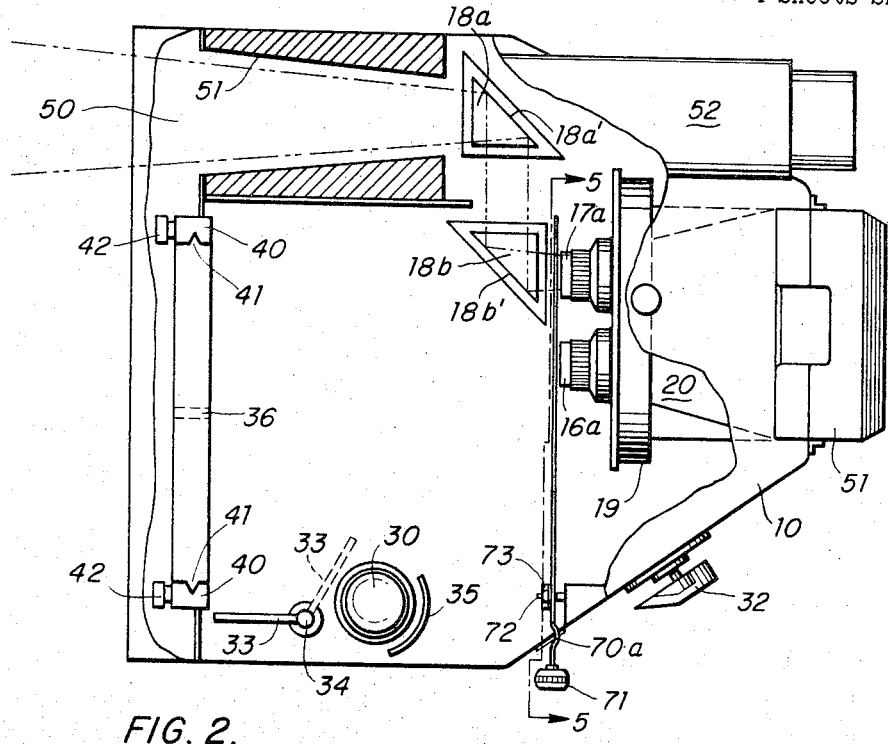
FIGURE 2 is a plan view of the camera with a portion of the housing removed.

Disposed between the image receiving material 11 and the lens plate 15 are shutter means 19 and a baffle 20 having light conduits formed therein. In the preferred embodiment, the shutter means is a unitary shutter 19 of the multiple leaf type wherein all of the leaves are simultaneously actuated by movement of the shutter actuating lever 19a opening all four lenses 16a, 16b, 17a and 17b simultaneously to provide a single exposure. Individual shuttering means for each lens that is mechanically or electrically simultaneously actuated may also be employed to provide the equivalent of a single exposure of the preferred unitary shutter means illustrated. If a unitary shutter is employed, as illustrated, it is desirable to keep the shutter diameter at a minimum in order to reduce parallax in the resultant pohtographs, to utilize commercially available shutters and to maintain the compactness of the camera. However, a small diameter shutter imposes space limitations for fitting the four lenses into the system. With the use of a small diameter shutter the subject lenses are in line with a portion of the data card 13. Therefore two image reflective surfaces in the form of right angle prisms 18a and 18b are employed to transmit the image rays of the subject to the subject lenses 17a and 17b. In FIG. 2, there is illustrated a plan view of the camera with the top portion of the housing removed. As can be seen in FIG. 2, the housing 10 is provided with an aperture 50 for receiving the image of the subject. The prism 18a is disposed directly behind a light tunnel 51 formed in the housing. The tunnel 51 couples the aperture 50 to the prism 18a. The rear surface 18a' of prism 18a is reflecting causing the light rays to be deflected ninety degrees. The prism 18b optically couples prism 18a to the subject lenses 17a and 17b. The rear surface 18b' of prism 18b is a reflecting surface causing the light rays entering prism 18b to be deflected ninety degrees into the lenses 17a and 17b (shown in FIG. 1). Thus, it can be seen in FIG. 2 that while the lateral spacing necessary for accommodating the easel 14 and subject aperture 50 is relatively large the shutter diameter and lens spacing is kept at a minimum.

Referring again to FIG. 1, light rays eminating from the center of the subject 12 are shown by dot-dash lines. The prism and lens arrangement shown permit the clustering of the four lenses 16a, 16b, 17a and 17b in close spaced relationship thereby allowing the use of a single unitary shutter 19 for opening all four lenses substantially simultaneously with a single operation of the shutter.

Disposed between the shutter 19 and image receiving material 11 is a light baffle 20. The baffle is configured to form four light conduits, one for each lens. The outer wall of baffle 20 has edges 21 adjacent the focal plane of the camera defining the outer rectangular perimeter of the identification cards. A plate 22 bisecting the baffle and extending between the focal plane and shutter 19 has an edge 23 adjacent the focal plane which divides the image receiving sheet into two equal areas for providing two identification cards. The light conduit coupling the subject lens 17a to the image receiving material is formed by a vertical plate 24 coupled to plate 22 and a horizontal plate 25 coupling plate 24 to the outer wall of baffle 20. The aforementioned conduit has edges adjacent the focal for defining the perimeter of the rectangular subject area 11c on the identification card. The vertical plane 24 increases in height from the shutter to the focal plane, whereby the light conduit is a tapered rectangular cross section between the shutter and focal plane. In FIG. 1A there is shown an end view of the baffle 20 as viewed from the camera focal plane with the shutter open. The tapered form of the subject light conduit permits the imaging ray representative of point x on the data card 13 (see FIG. 1) entering the data lens 16a, for example, to meet the image receiving material at point x without being deflected by the perimeter of subject light conduit. Similarly, the lower subject light conduit is tapered to permit the imaging ray representative of point x entering data lens 16b to meet the image receiving material without being deflected by the perimeter of the lower subject light conduit. Any deflecting of the image ray would result in a shadow formed on the data area of the card in the vicinity of point x.

Figure 3:
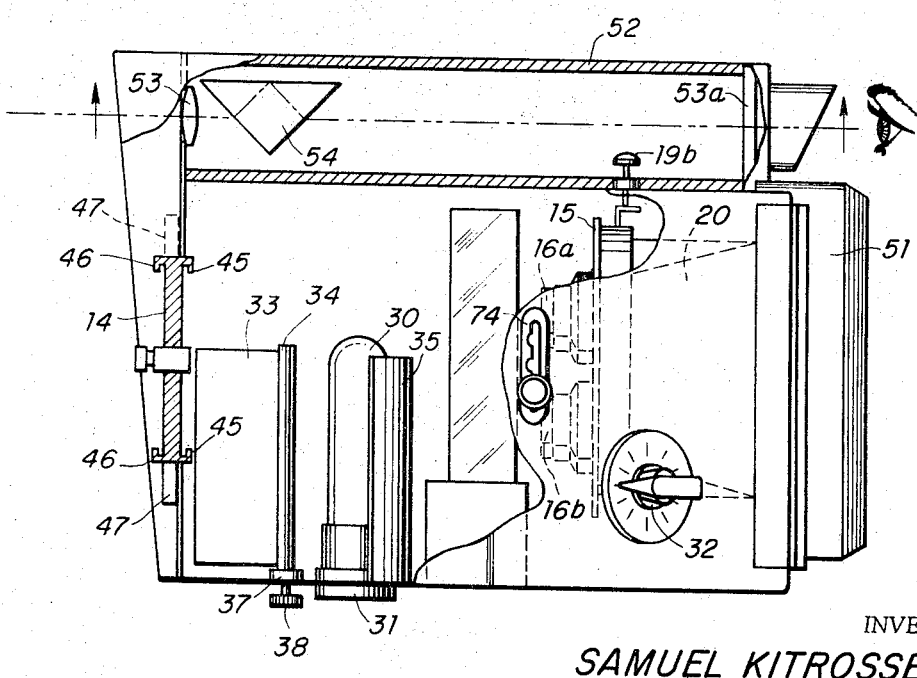
FIGURE 3 is a side elevation view of the camera, partly in section, with a portion of the housing removed.

Referring now to FIGS. 2 and 3, there is here illustrated the data card illumination means 30. FIG. 3 is a side elevation view of the camera with a portion of the housing broken away. Mounted within housing 10 and disposed between the lens plate 15 and easel 14 is data card illumination means in form of lamp 30. The illumination means may be an incandescent lamp as shown in FIG. 3 or a strobe lamp. The power supply means for the lamp as well as means for varying the power input to the lamp, are well known in the art and have only been illustrated schematically by the electrical receptacle 31 and knob 32 for controlling the power input. The means for varying the power input, for example, may be a variable resistor in series with the power supply and lamp. Thus, knob 32 could control the wiper of a variable resistor. Illumination means 30 is disposed in the housing so as not to interfere with optical coupling between the data lens 16a and data lens 16b and the data card in easel 14. As can be seen in FIG. 2, the lamp is located adjacent one wall of the housing. In order to uniformily illuminate the data card, a curved reflector 35 is disposed behind the lamp 30 thereby tending to substantially uniformly illuminate the data card. In order to facilitate balancing of the light on the data card with the light on the subject being photographed, the easel 14 is provided with at least one aperture 36 to permit a light meter probe to be inserted therein. This permits balancing of the light from the lamp 30 with the light on the subject by comparing a corresponding reading on the light meter held in front of the subject. To further facilitate balancing the light output from lamp 30 to the data card, there is also coupled to the housing and disposed between the lamp 30 and easel 14 a means for varying the light output from the lamp 30 in the form of a filter 33. Filter 33 is pivotally mounted on a pivot pin 34 coupled to the housing 10 by a bushing 37. The pivot pin 34 has a knob 38 coupled thereto externally of the housing 10. The knob permits pivoting the filter between the various positions shown in FIG. 2. If it is desired only to vary the amount of illumination striking the card, the filter may be of the type known in the art as a neutral density filter. In operation, the neutral density filter reduces the illumination of the data card by a factor of approximately 40. For films having high sensitivity, such as Polaroid Corporation Black and White type 107, the filter is closed as shown by the dotted line in FIG. 2. When using Polaroid Color Film type 108, the filter is opened as shown by the solid lines in FIG. 2. The filter preferably also contains a polarizer in order to reduce specular light and increase contrast of the data image. In some applications it may be desirable to have only selected wavelengths of light output from the lamp strike the data card. For example, when using certain types of color film, the filter 33 may be a colored filter.

In FIG. 2 there is also illustrated a support means for the easel in the housing 10. Extending from the front of the housing 10 are a pair of spaced bushings 40 having recesses formed therein for receiving pivot pins 41 extending from the easel 14. This permits pivoting of the easel about an axis extending through both pivot pins. A pair of set screws 42 hold the pivot pins in the bushings 40 while permitting pivotal movement of the easel. As can be seen in FIG. 3, the easel has formed therein and extending along its entire length a pair of opposed parallel support members in the form of channels 45. On its opposite side, the easel has a similarly formed pair of channels 46. In operation the data card is slid into place along the channels 45. With the symmetrical construction of the support members 45 and 46, as shown, while one data card supported in grooves 45 is being photographed, the next data card may be loaded into the channels 46 without interferring with the photographing of the first card. The easel 14 has a stop 47 formed on the bottom thereof to permit accurate alignment of the camera focal plane during photography. Thus, when the card in channels 46 is to be photographed, the stop 47 would be in the position shown by the dotted lines.

In many applications for identification cards a portion of the data to be photographed on each card is constant while another portion of the data is variable. For example, in a driver's license the name of the state, as well as various headings such as name, address, height, etc. would be constant on each card. It may therefore be desirable that only the variable portion of the data, such as the subjective data on each subject, be changed with the photography of each subject.

Figure 4:
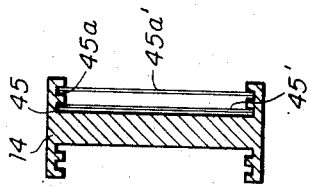
FIGURE 4 is a sectional view illustrating another embodiment of the camera easel.

In another embodiment of the present invention, the easel 14, instead of having a single pair of spaced guide rails on either side, may be formed with a plurality of spaced support members. The cross section of one of such embodiments is shown in FIG. 4. On one side of the easel there are formed channels 45 and a second set of channels 45a. The channels 45 support thereon a data card 45′ containing the variable portion of the data, the channels 45a support thereon in parallel spaced relationship a transparent data card 45′ containing the fixed data. The camera data lenses therefore see a composite of the fixed data and the variable data. While the easel has been shown as having symmetrical support members formed on either side to permit loading the opposite side while photographing one side, it is to be understood that the easel can be formed with the guide rails only on one side.

Another method for maintaining the fixed data in place while only changing the variable data is to place the fixed data on a transparency. As illustrated in FIG. 1, the transparency 48 is disposed between the edges 21 of light baffle 20 and image receiving material 11, and can be supported on the edges 21 by the clamping pressure between the camera back and baffle 20. The fixed data in one embodiment may be a half-tone screen to be placed over the subject area to form a dot pattern on the image receiving material, thereby permitting future offset printing of the data card or to alter apparent contrast of the image, the latter permitting the use of high contrast film which is desirable for the continuous tone data. In the alternative, fixed data may be any other form of fixed data such as the name of the state or a company logotype, etc.

Referring again to FIG. 3, coupled to the camera assembly is a camera back for storing and transporting image receiving material into the focal plane of the camera and for processing film after exposure by removing the image receiving material from the back 51. One camera back is known in the art as the "film pack backs" manufactured by the Polariod Corporation, Cambridge, Mass. The imaging receiving material is of the diffusion transfer reversal type. Another type camera back is described in United States Patent No. 2,435,715, filed in the name of E. H. Land on Oct. 6, 1945. Suitable coupling means are provided for coupling the camera back to the camera assembly. Thus, it can be seen in FIG. 2 the assembly of the lens plate 15, shutter 19 and baffle 20 form a first light-tight compartment within the housing 10 together with the camera back 51.

Referring again to FIG. 3 there is here illustrated a viewfinder mounted on top of the housing 10 to permit viewing of the subject to be photographed by the operator of the camera. The viewfinder is generally designated by the numeral 52 and has a light tunnel formed therein. At the extremities of the viewfinder there are optical elements 53 and a ground screen 53a. A surface prism 54 is disposed between the optical elements and presents a right side up image of the subject being photographed to the operator.

Figure 5:
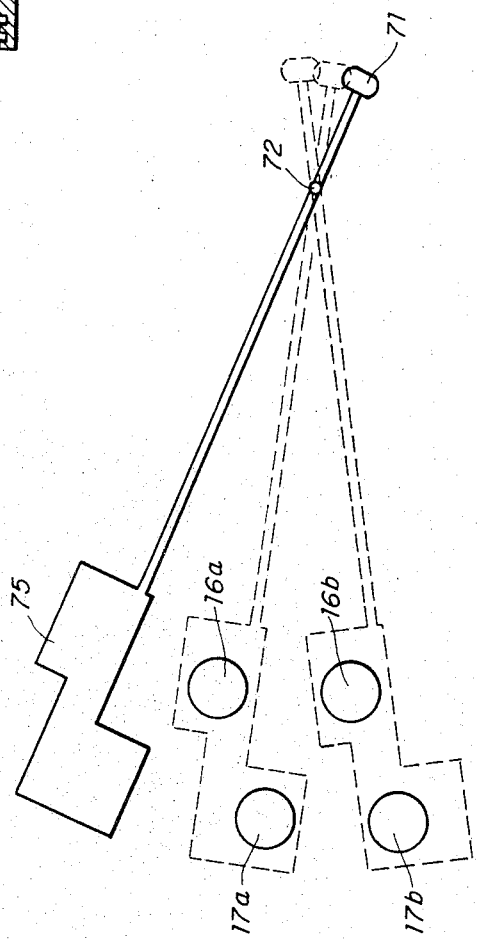
FIGURE 5 is a view taken along line 5—5 in FIG. 2 illustrating the operation of the masking mechanism.

While in most applications it is desirable to have two identical identification cards photographed simultaneously for the purposes of having a file copy as well as one given to the person being photographed, it is occasionally desired to only photograph a single identification card. In order to perform this operation a masking means is provided. Referring now to FIGS. 2 and 5, the masking means is in the form of an opaque blade 75 shown in the open position in FIG. 5. The blade 75 is pivotally coupled to the housing 10 by a pivot pin 72 and nut 73. By moving knob 71 to cause blade 75 to pivot about pin 72 the blade may be placed in an open position, as shown by the solid lines, or be moved into position to block lens pairs 16a and 17a or 16b and 17b. The blade is selectively held in any of the three positions by a flexible indent 70a formed therein (FIG. 2) and three notches formed in a guide plate 74 (FIG. 3) coupled to the housing.

Figure 6:
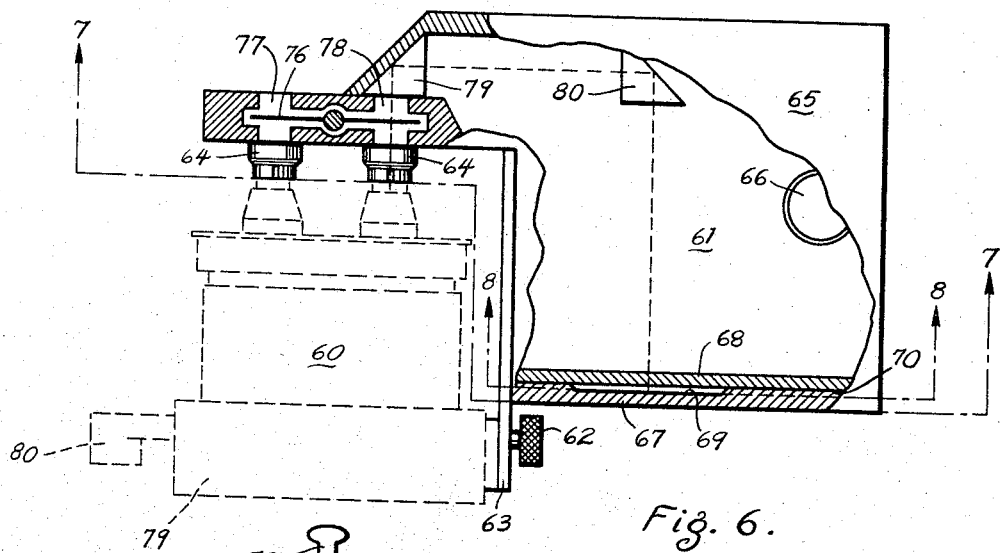
FIGURE 6 is a plan view of a camera assembly illustrating another embodiment of the present invention.
Figure 7:
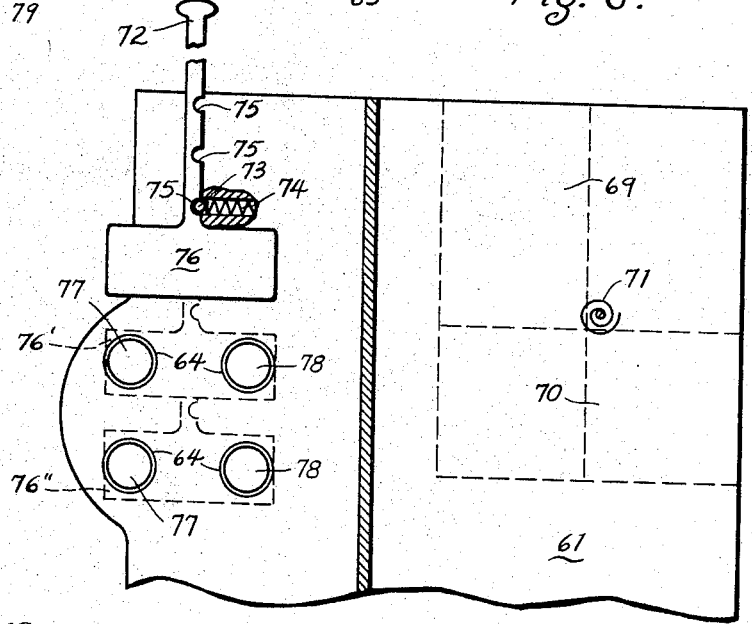
FIGURE 7 is a sectional view taken along line 7—7 in FIG. 6.
Figure 8:
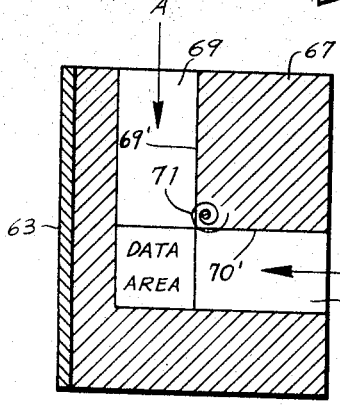
FIGURE 8 is a sectional view taken along line 8—8 in FIG. 6.

Referring now to FIGS. 6 to 8, inclusive, there is here illustrated another embodiment of the present invention wherein the identification camera is formed by two major assemblies. FIG. 6, which is a plan view, partially in section, of this embodiment, illustrates one of the aforementioned assemblies at numeral 60. This assembly, which is shown in dashed lines, comprises the image forming and recording system of the identification camera. System 60 includes, although not illustrated, four optical systems, a shuttering system to provide simultaneous exposure, a plurality of baffles to form light tunnels between the optical systems and a focal plane, and means for storing and transporting image receiving material in the focal plane. Optical systems, shuttering mechanisms, baffles, and image receiving material storing and transporting means, such as those illustrated in the embodiments described in FIGS. 1 through 5, may be utilized in the instant embodiment. In the alternative, the camera described in my United States Patent No. 3,128,- 685, issued Apr. 14, 1964, and assigned to the common assignee of the instant application, may be used as the image forming and recording system 60. Coupled to the image forming and recording system 60 is the second assembly, a data support assembly illustrated at numeral 61 in FIG. 6. The data support assembly is coupled to assembly 60 through a knurled screw 62 which passes through plate 63 and into a threaded aperture in assembly 60, the threaded aperture not being shown. In addition, the lens elements of assembly 60 are properly aligned with the data support assembly 61 by means of resilient couplings 64. One such resilient coupling is provided for each lens in assembly 60. Thus, in the preferred embodiment there are four such couplings as shown in FIG. 7, which is a view taken along line 7—7 in FIG. 6. With this arrangement, the camera described in my aforementioned patent, 3,128,685, may be used for identification purposes as described therein or together with the data support assembly as described herein.

Referring now to FIGS. 6 and 7, the data support assembly 61 generally includes a housing 65. Mounted within the housing 65 are illumination means, partially illustrated at 66, and means for supporting a data card. The means for supporting a data card includes a plate 67 forming the rear wall 68 of housing 65. The plate 67 has two mutually perpendicular slots formed therein at 69 and 70 to permit insertion of a card containing desired data concerning the subject to be photographed. Plate 67 is coupled to a plate 68 which has an aperture formed therein which permits data on the data card in either slot 69 or 70 to be exposed to the interior of the housing 65. This is more clearly illustrated in FIG. 8 which is a sectional view taken along line 8—8 in FIG. 6. The open area in plate 68 is labelled "Data Area" in this view. The mutually perpendicular slots 69 and 70 are of a width sufficient to accept a data card inserted therein. At the junction of the edges 69' and 70' of slots 69 and 70, there is coupled to the plate 67 a resilient spring 71 which extends into slots 69 and 70 thus engaging the data card when it is inserted either into slot 69 in the direction of arrow A or into slot 70 in the direction of arrow B. One edge of the card will be urged against the opposed edge of the slot by the spring 71 to assure consistent alignment of the data card with respect to the image forming and recording system.

Referring again to FIGS. 6 and 7, the mutually perpendicular data support means in forms of slots 69 and 70 permit a selective orientation of the data format relative to the subject on the card, such as requirements for identification badges which are often different than identification cards. The data card is illuminated by means of a lamp 66 mounted within the housing 65. The illumination means together with light balancing means may be identical with the illumination and balancing means described in connection with the embodiment shown in FIGS. 1 through 5. The data card is coupled to the data receiving optical elements of the image forming and recording system 60 by means of two right angle prisms 79 and 80. As can be seen, the data support assembly includes two apertures 77 and two apertures 78 to permit the image forming light from the data card to enter the data lenses and to permit image forming light from the subject to enter into the appropriate subject lenses. When the camera described in my aforementioned patent is utilized for the image forming and recording system 60, optical elements are mounted within apertures 78 to properly focus the data in the focal plane of system 60 without altering the optics of the camera described in my patent. Like the embodiment illustrated in FIGS. 1 through 5, this embodiment may have selective masking of pairs of lenses. One form of masking device is shown at 76. This masking device includes an opaque blade that is slidably mounted in the data support housing to cover selective pairs of openings 77 or 78. The blade is connected to a handle 72 having three indents 75 formed therein. A ball 73 and spring 74 are mounted in the housing to engage desired indents. The three positions of the masking device are shown at 76, 76', and 76".

A further advantage of this embodiment is that the data support system is located on the same side of the camera as the image receiving material transporting and storing system and viewfinder. Thus, the operator of the camera is able to reload the film, place the data card in the camera, and view the subject from a single position.

While not specifically described in connection with this embodiment, it should be understood that various components of the embodiments described in connection with FIGS. 1 through 5, may be utilized herein. For example, fixed data may be placed adjacent the focal plane and the data support means may have parallel grooves for overlaying data, etc.

While I have described what is presently considered the preferred embodiments of my invention, it will be obvious to those skilled in the art that various other changes and modifications may be made therein without departing from the inventive concept, and it is aimed in the appended claims to cover all such changes and modifications as fall within the true spirit and scope of my invention.

What is claimed is:

1. A camera for providing, with a single exposure, a plurality of identical identification cards containing a photograph of a subject and data relating thereto on a unitary sheet of photographic material disposed in said camera focal plane, said camera comprising:

a housing having a light tight compartment therein;

baffle means within said light tight compartment, said baffle means having edges disposed substantially in said focal plane for dividing said unitary sheet of photographic material into at least four discrete areas;

a plurality of optical means within said housing, each of said means having a first focal length substantially focusing said data through one of said baffle means onto said image receiving material for providing a plurality of images of said data;

a plurality of second optical means coupled to said housing having a second focal length and substantially focusing a subject disposed remotely from said housing through second ones of said baffle means, onto said image receiving material to provide a plurality of images of said subject;

unitary shutter means coupling said optical means and said photographic material for providing simultaneous exposure of said image receiving material;

data sheet support means coupled to said housing for supporting a data sheet in spaced parallel relationship to said focal plane, said support means having a plurality of surfaces with data sheet holding means coupled thereto, said surfaces being rotatable about a central axis whereby an additional data sheet may be coupled thereto when a first data sheet is in position to be photographed through said second optical means;

means for transporting and storing an image receiving material within said light tight compartment in said camera focal plane, including means for processing said photographic material, whereby a single exposure through said shutter provides a plurality of identification cards in the form of a plurality of photographs of said data and subject on said unitary sheet of photographic material.

2. The combination of claim 1 wherein each of said surfaces has a plurality of holding means for coupling a plurality of data sheets to each of said surfaces.

3. A camera for providing, with a single exposure, a plurality of identical identification cards containing a photograph of a subject and data relating thereto on a unitary sheet of photographic material disposed in said camera focal plane, said camera comprising:

a housing having a light tight compartment therein;

baffle means within said light tight compartment, said baffle means having edges disposed substantially in said focal plane for dividing said unitary sheet of photographic material into at least four discrete areas;

a plurality of optical means within said housing, each of said means having a first focal length substantially focusing said data through one of said baffle means onto said image receiving material for providing a plurality of images of said data;

a plurality of second optical means coupled to said housing having a second focal length and substantially focusing a subject disposed remotely from said housing through second ones of said baffle means, on said image receiving material to provide a plurality of images of said subject;

unitary shutter means coupling said optical means and said photographic material for providing simultoneous exposure of said image receiving material;

data sheet support means coupled to said housing for supporting a data sheet in spaced parallel relationship to said focal plane, said support means having a plurality of surfaces with data sheet holding means coupled thereto, said surfaces being rotatable about a central axis whereby an additional data sheet may be coupled thereto when a first data sheet is in position to be photographed through said second optical means;

illumination means within said housing, disposed between said data support means and second optical means for illuminating said data;

means for transporting and storing an image receiving material within said light tight compartment in said camera focal plane, including means for processing said photographic material, whereby a single exposure through said shutter provides a plurality of identification cards in the form of a plurality of photographs of said data and subject on said unitary sheet of photographic material.

References Cited

UNITED STATES PATENTS

| | | | |
|---|---|---|---|
| 1,645,590 | 10/1927 | Ernst | 88—24 |
| 2,394,225 | 2/1946 | Ashford | 95—1.1 X |
| 2,406,152 | 8/1946 | Levine | 95—1.1 X |
| 2,438,219 | 3/1948 | Johnston | 88—24 |
| 2,896,522 | 7/1959 | Stein | 95—1.1 |
| 2,942,365 | 6/1960 | Badalich | 88—24 |
| 3,128,685 | 4/1964 | Kitrosser | 95—18 |
| 3,134,313 | 5/1964 | Gold | 95—1.1 X |

FOREIGN PATENTS 914,236  6/1946  France.

JOHN M. HORAN, *Primary Examiner.*